(12) United States Patent
Müller et al.

(10) Patent No.: US 11,533,852 B2
(45) Date of Patent: Dec. 27, 2022

(54) WEIGHING SYSTEMS AND METHODS FOR DYNAMIC LOADS

(71) Applicant: Trimble Inc., Sunnyvale, CA (US)

(72) Inventors: Christian Müller, Büren (DE); Philipp Tewes, Salzkotten (DE)

(73) Assignee: Trimble Inc., Sunnyvael, CA (US)

( * ) Notice: Subject to any disclaimer, the term of this patent is extended or adjusted under 35 U.S.C. 154(b) by 488 days.

(21) Appl. No.: 16/676,993

(22) Filed: Nov. 7, 2019

(65) Prior Publication Data

US 2021/0137013 A1    May 13, 2021

(51) Int. Cl.
*G01N 5/00* (2006.01)
*G01G 19/02* (2006.01)
*A01D 90/02* (2006.01)
*B60P 3/00* (2006.01)

(52) U.S. Cl.
CPC .............. *A01D 90/02* (2013.01); *B60P 3/00* (2013.01); *G01G 19/021* (2013.01); *G01N 5/00* (2013.01)

(58) Field of Classification Search
CPC ......... G01G 19/02; G01G 19/021; A01D 9/02
See application file for complete search history.

(56) References Cited

U.S. PATENT DOCUMENTS

| 8,749,628 | B2 * | 6/2014 | Wuestefeld | G01F 1/00 198/810.01 |
| 2006/0046800 | A1 * | 3/2006 | Kaltenheuser | A01D 41/12 460/6 |
| 2012/0200697 | A1 | 8/2012 | Wuestefeld et al. | |
| 2018/0373966 | A1 * | 12/2018 | Beschorner | G06K 9/6293 |
| 2020/0114997 | A1 * | 4/2020 | Liet | G01G 19/02 |
| 2020/0200537 | A1 | 6/2020 | Ceisel et al. | |
| 2022/0113365 | A1 * | 4/2022 | Sosnin | H04W 64/00 |

FOREIGN PATENT DOCUMENTS

EP    2 779 818 B1    10/2016

OTHER PUBLICATIONS

Extended European Search Report for Application No. 20205218.9-1001, dated Mar. 19, 2021, 11 pages.
European Office Action for Application No. 20 205 218.9-1001, dated May 4, 2022, 8 pages.

* cited by examiner

*Primary Examiner* — Kaitlin S Joerger
(74) *Attorney, Agent, or Firm* — Kilpatrick Townsend & Stockton LLP

(57) ABSTRACT

Weighing systems and methods for dynamic loads are provided. A plurality of sensors are configured to provide force information based on a weight of a bin and a weight of a material in the bin. An IMU is coupled to the bin and configured to provide gyroscope information and accelerometer information based on orientation and movement of the bin respectively. A controller is communicatively coupled to the plurality of sensors and to the IMU. The controller is configured to receive the force information from the plurality of sensors and the gyroscope information and the accelerometer information from the IMU. The controller is configured to compensate the force information based on slope of the bin to provide slope-compensated force information, filter the slope-compensated force information using a Kalman filter to provide filtered force information, and estimate the weight of the material in the bin based on the filtered force information.

20 Claims, 6 Drawing Sheets

WEIGHING SYSTEMS AND METHODS FOR DYNAMIC LOADS

FIELD

Embodiments described herein relate generally to weighing systems and methods for dynamic loads, and more particularly, to estimating weight of agricultural crops during harvesting and estimating weight of agricultural products like fertilizer and seeds during application or planting.

BACKGROUND

Weighing agricultural crops while harvesting is important for determining yield and implementing yield management systems. Conventional techniques for estimating weight of agricultural crops are prone to error due to uneven or rough ground. During harvest, trucks, carts, and/or trailers (e.g., bins) carrying agricultural crops bounce around which causes disturbances in weight measurement systems. Factors such as chassis and suspension of machinery and pot holes contribute to the disturbances. These same factors contribute to disturbances when applying a product to an agricultural crop. Improved systems and methods for estimating weight of agricultural materials in a bin are desired.

SUMMARY

Embodiments described herein provide improved systems and methods for estimating weight of agricultural materials (crops, seeds, fertilizer, manure, or the like) in a bin. The systems and methods are particularly beneficial when used with dynamic loads that are increasing (or decreasing) in weight and that are moving or bouncing around causing measurement disturbances. The systems and methods improve measurements during harvest or application when the bins are bounced around over uneven or rough ground or generally when loads are moved over rough terrain. The systems and methods reduce an impact of measurement disturbances and thus improve the value of measurement data.

In accordance with a particular embodiment, for example, a system for estimating weight of agricultural materials in a bin includes a plurality of load cells configured to provide force information as a function of a weight of the bin and a weight of the agricultural materials in the bin. An inertial measurement unit (IMU) is coupled to the bin and configured to provide gyroscope information and accelerometer information as a function of orientation and movement of the bin respectively. A controller is configured to receive the force information from the plurality of load cells and the gyroscope information and the accelerometer information from the IMU. The controller is configured to determine a pitch and a roll of the bin based on the gyroscope information and the accelerometer information, adjust the force information based on the pitch and the roll to provide slope-compensated force information, adjust the slope-compensated force information based on a zero-reading from the load cells obtained when the bin is substantially empty to obtain adjusted force information, determine a maximum standard deviation of the gyroscope information and of the accelerometer information, determine a setting of a Kalman filter based on the maximum standard deviation, filter the adjusted force information using the Kalman filter to provide filtered force information, and estimate the weight of the agricultural materials in the bin based on the filtered force information.

In an embodiment, the system also includes a display configured to receive the estimate of the weight of the agricultural materials in the bin and display the estimate of the weight.

In another embodiment, the slope-compensated force information includes force information from each of the plurality of load cells. The adjusted force information may be provided to the Kalman filter includes a single adjusted force information value that is a sum of adjusted force information values from each of the plurality of load cells.

In another embodiment, the force information provided from the plurality of load cells is a single value that is an average of force information values from each of the plurality of load cells.

In another embodiment, the controller is further configured to filter the pitch and the roll before adjusting the force information based on the pitch and the roll.

In another embodiment, the controller is also configured to pre-filter the force information to provide pre-filtered force information, and the pre-filtered force information is adjusted based on the pitch and the roll to provide the slope-compensated force information.

In another embodiment, the maximum standard deviation is determined based on at least one of standard deviations from the angular acceleration of yaw, pitch, and roll values from the gyroscope information and standard deviations of X, Y, and Z values from the accelerometer information.

In another embodiment, the IMU and the controller share at least part of a common housing that is coupled to the bin or the IMU and controller are integrated on a same printed circuit board (PCB).

In yet another embodiment, the plurality of load cells and the IMU are communicatively coupled to the controller via wired communications.

In accordance with another embodiment, a system for estimating weight of a material in a bin includes a plurality of sensors configured to provide force information based on a weight of the bin and a weight of the material in the bin. An IMU is coupled to the bin and configured to provide gyroscope information and accelerometer information based on orientation and movement of the bin respectively. A controller is communicatively coupled to the plurality of sensors and to the IMU. The controller is configured to receive the force information from the plurality of sensors and the gyroscope information and the accelerometer information from the IMU. The controller is configured to compensate the force information based on slope of the bin to provide slope-compensated force information, filter the slope-compensated force information using a Kalman filter to provide filtered force information, and estimate the weight of the material in the bin based on the filtered force information. The Kalman filter uses a setting that is determined based on the gyroscope information and the accelerometer information.

In an embodiment, the controller is further configured to adjust the slope-compensated force information based on a zero-reading from the plurality of sensors obtained when the bin is substantially empty, the slope-compensated force information adjusted prior to filtering the slope-compensated force information.

In another embodiment, the controller is further configured to determine a standard deviation of the gyroscope information and of the accelerometer information, and the setting of the Kalman filter is based on the standard deviation.

In another embodiment, the slope-compensated force information includes force information from each of the plurality of sensors, and the slope-compensated force information provided to the Kalman filter includes a single slope-compensated force information value that is a sum of slope-compensated force information values from each of the plurality of sensors.

In another embodiment, each of the plurality of sensors include one or more load cells.

In another embodiment, the system also includes a display. The controller is configured to communicate with the display via wireless communications, and the display is configured to receive the estimate of the weight of the material in the bin from the controller and display the estimate of the weight.

In another embodiment, the controller is further configured to determine the slope of the bin based on the gyroscope information and the accelerometer information.

In yet another embodiment, the controller is further configured to pre-filter the force information to provide pre-filtered force information, and the pre-filtered force information is adjusted based on the slope to provide the slope-compensated force information.

In accordance with yet another embodiment, a method for estimating weight of agricultural materials in a bin includes determining a pitch and a roll of the bin based on gyroscope information and accelerometer information from an IMU. The IMU is coupled to the bin and configured to provide the gyroscope information and the accelerometer information as a function of orientation and movement of the bin respectively. Force information from a plurality of load cells is adjusted based on the pitch and the roll to provide slope-compensated force information. The plurality of load cells are configured to provide force information as a function of a weight of the bin and a weight of the agricultural materials in the bin. A setting of a Kalman filter is determined based on the gyroscope information and the accelerometer information. The slope-compensated force information is filtered using the Kalman filter to provide filtered force information. The weight of the agricultural materials in the bin is estimated based on the filtered force information.

Numerous benefits are achieved using embodiments described herein over conventional techniques. Some embodiments, for example, use an IMU to reduce an impact of measurement disturbances. The IMU can be used to enable slope compensation and also to estimate a magnitude of the disturbances for use in determining filter settings. This can improve measurement accuracy. Also, in some embodiments, this can allow more accurate weight measurements to be obtained in a field during actual harvest. This can provide information that is useful in implementing yield management strategies. Depending on the embodiment, one or more of these features and/or benefits may exist. These and other benefits are described throughout the specification with reference to the appended drawings.

DETAILED DESCRIPTION

Figure 1:
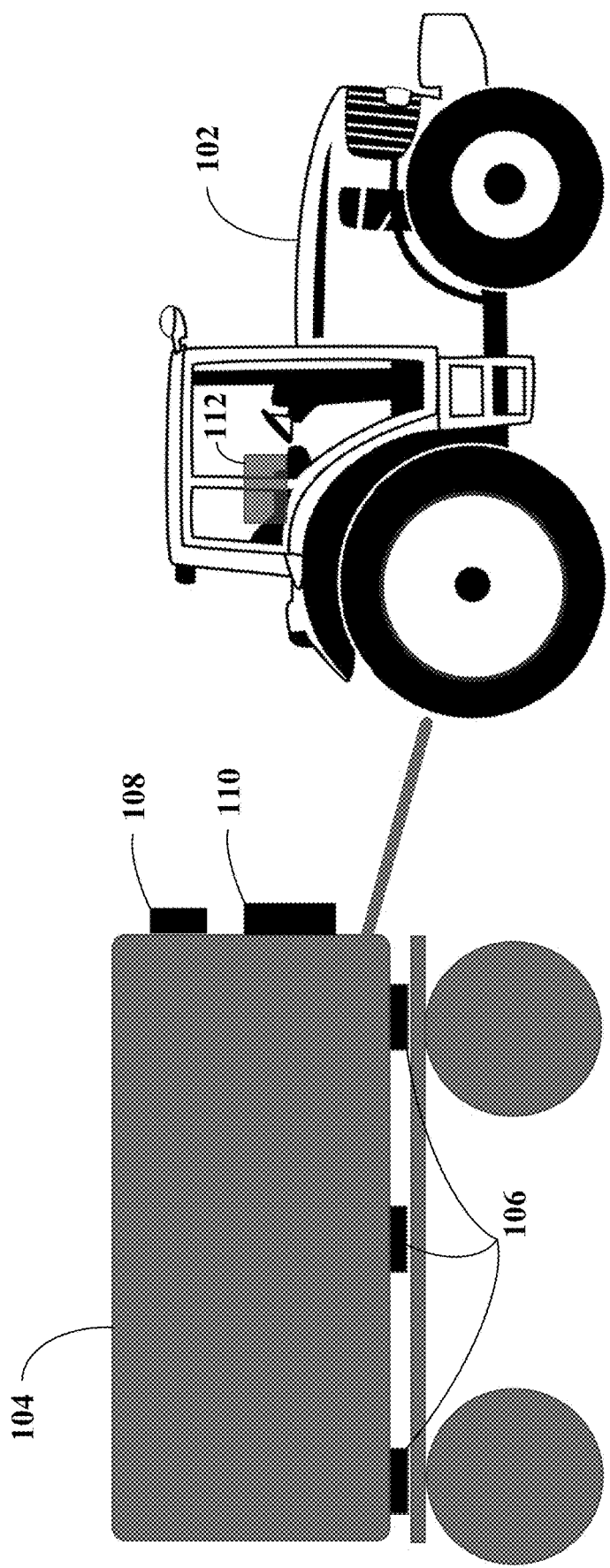
FIG. 1 is a simplified drawing of an agricultural vehicle towing a trailer or grain cart that includes sensors, an IMU, and a controller in accordance with an embodiment.

Embodiments described herein provide systems and methods for estimating weight of agricultural materials (crops, seeds, fertilizer, manure, and the like) in a bin. In am embodiment, for example, an IMU is used to determine pitch and roll of a bin. Force information can be corrected based on the pitch and roll. Measurement information from the IMU can also be used to determine filter settings. These embodiments can be used in a number of different applications. FIG. 1 provides a non-limiting example of a tractor pulling a trailer or grain cart (e.g., bin). Embodiments can also be used with trucks or trackors having attached bins. Embodiments can also be used with any other system that includes one or more bins for carrying material. The type of system will not generally be specified herein other than to refer simply to a bin. The material will be referred to as an agricultural material but the embodiments can be used for any type of material that is being added to, carried by, or dispensed from the bin.

FIG. 1 is a simplified drawing of an agricultural vehicle towing a trailer or grain cart that includes sensors, an IMU, and a controller in accordance with an embodiment. Specifically, this example shows a tractor 102 towing a bin 104. The tractor 102 may be any type vehicle that is motorized and can tow a bin 104. In some embodiments, the bin 104 can be attached on a rear of the tractor 102 at a lifting mechanism such as a hitch. The bin 104 can be any type of trailer, cart, or other structure capable of carrying a material such as an agricultural crop.

In this example, the bin 104 includes sensors 106. The sensors 106 may include any type of weighing system that provides force information based on a weight of the bin 104. Examples include load cells, compression or tension modules, strain gauges, or any other type of scale. Typically each sensor will provide an output (e.g., voltage or current) that correlates to force exerted on the sensor (force information). The sensors 106 may be coupled to the bin 104 (e.g., physically coupled to the bin 104, disposed under the bin 104, coupled to a chassis of the bin 104, coupled to a drawbar of the bin 104, etc.). In FIG. 1 there are three sensors 106 that are visible, but in actual implementations there may be any number of sensors 106 depending on the configuration of the bin 104 and the particular application for which the bin 104 is used. In the example of FIG. 1 there may be six sensors 106 (three on each side of the bin 104). In some embodiments, a sensor is placed at least at each corner of the bin 104.

An IMU 108 is coupled to the bin 104 or integrated with the bin 104. The IMU 108 is configured to provide gyroscope information based on orientation of the bin 104 and accelerometer information based on movement of the bin 104. The gyroscope information typically includes pitch and roll information and may also include yaw information. The accelerometer information typically includes acceleration information in X, Y, and Z axes.

The sensors 106 and the IMU 108 are communicatively coupled to a controller 110 via wired or wireless communications. In some embodiments, the IMU 108 and controller 110 share at least part of a common housing (e.g., the IMU 108 may be attached to a printed circuit board (PCB) of the controller 110 or the IMU 108 may be mounted inside a housing of the controller 110). The controller 110 is configured to receive the force information from the sensors 106 and the gyroscope and accelerometer information from the IMU 108. The controller 110 is configured to use this information to estimate a weight of a material in the bin 104.

A display 112 is located within a cab of the tractor 102. The display 112 may be configured to communicate with the controller via wired (e.g., controller area network (CAN)) or wireless (e.g., Bluetooth or WiFi) communications. The display 112 is configured to receive the estimate of the weight and display the estimate. The display 112 may also be configured to receive and display any other information from the controller 110. In some embodiments, the display 112 may also be configured to receive inputs for providing information to the controller 110.

Figure 2:
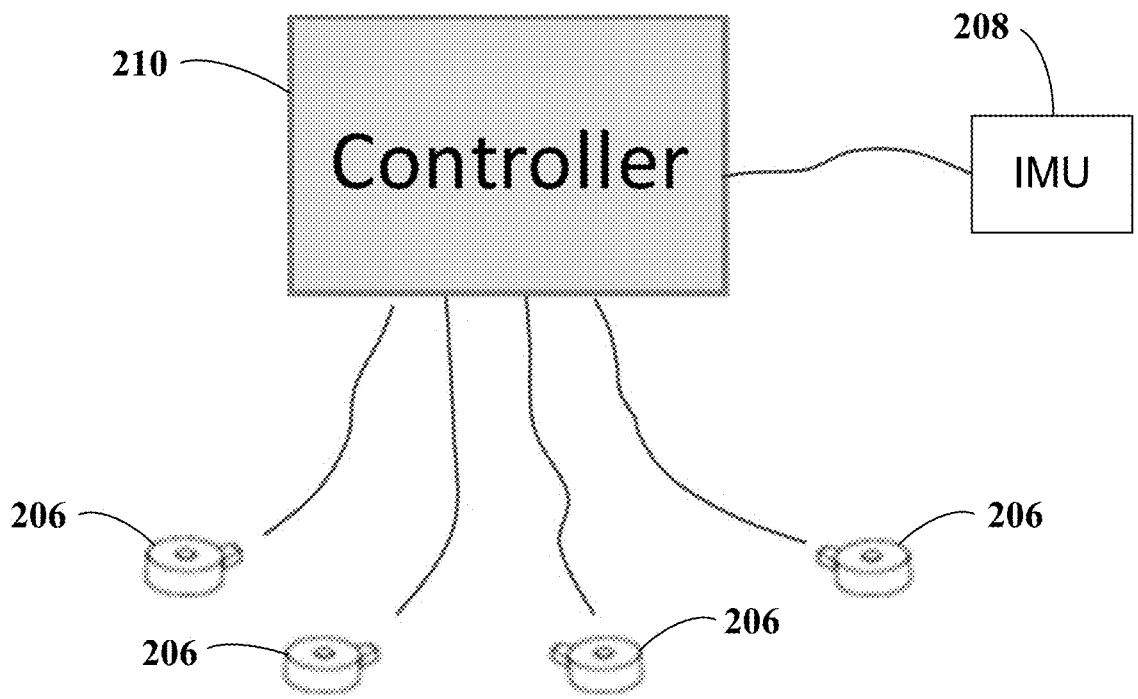
FIGS. 2-3 are simplified drawings of sensors, IMUs, and controllers in accordance with some embodiments.

FIG. 2 is a simplified drawing of sensors, an IMU, and a controller in accordance with an embodiment. In this example, sensors 206 and IMU 208 are communicatively coupled to controller 210. In embodiments where the IMU 208 is integrated with the controller 210, the IMU 208 may communicate with the controller 210 via an internal data bus. The sensors 206 may include load cells or other types of weighing systems as described previously. Each sensor 206 is separately coupled to the controller 210 so that signals from the sensor 206 can be sent to the controller 210.

Figure 3:
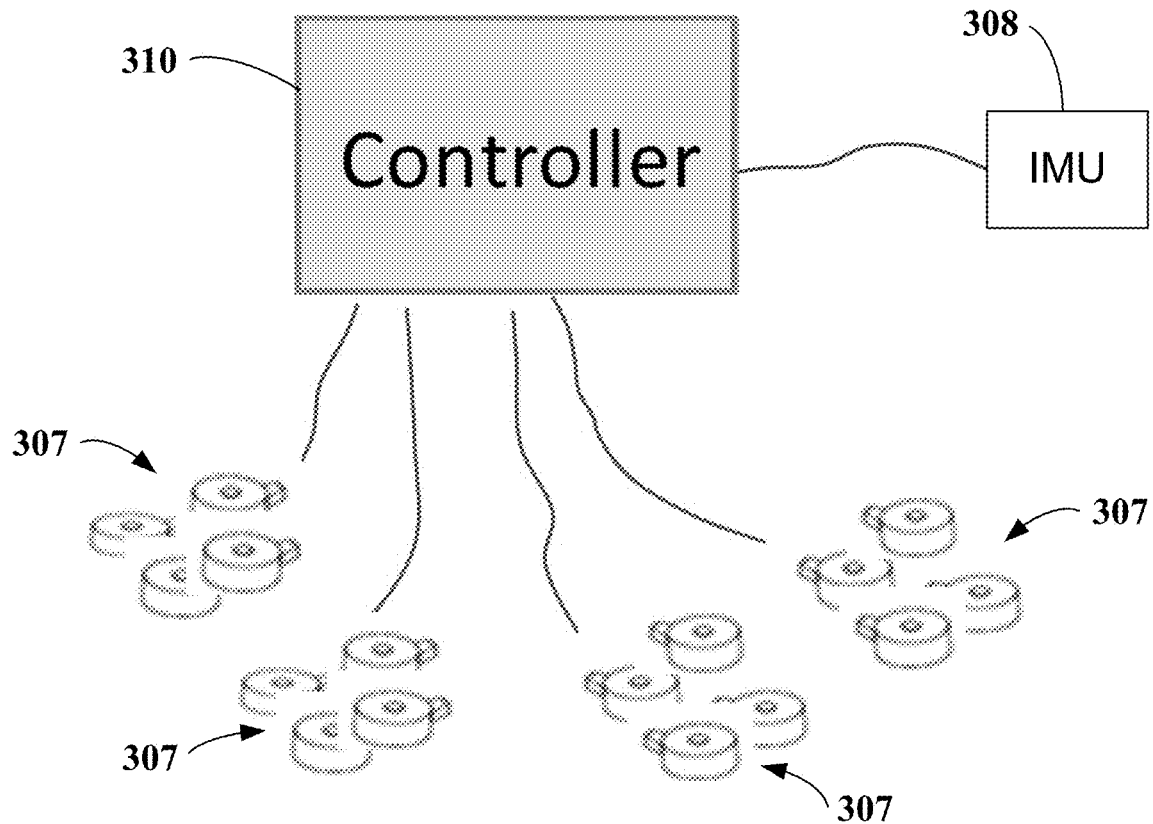

In the example of FIG. 3, groups of sensors 307 are communicatively coupled to controller 310. The individual sensors in each group 307 may be connected serially or in parallel. Each group of sensors 307 may be separately coupled to the controller 310 so that a single signal from the group of sensors 307 is sent to the controller 310. The signal may be, for example, an average of the readings from each of the sensors 307 in a group or a sum of the readings.

The controller may include one or more amplifiers to increase a power of signals received from the sensors and/or the IMU. The controller may also include one or more analog to digital converters (ADCs) to convert analog signals from the sensors and/or IMU to digital signals for processing.

Figure 4:
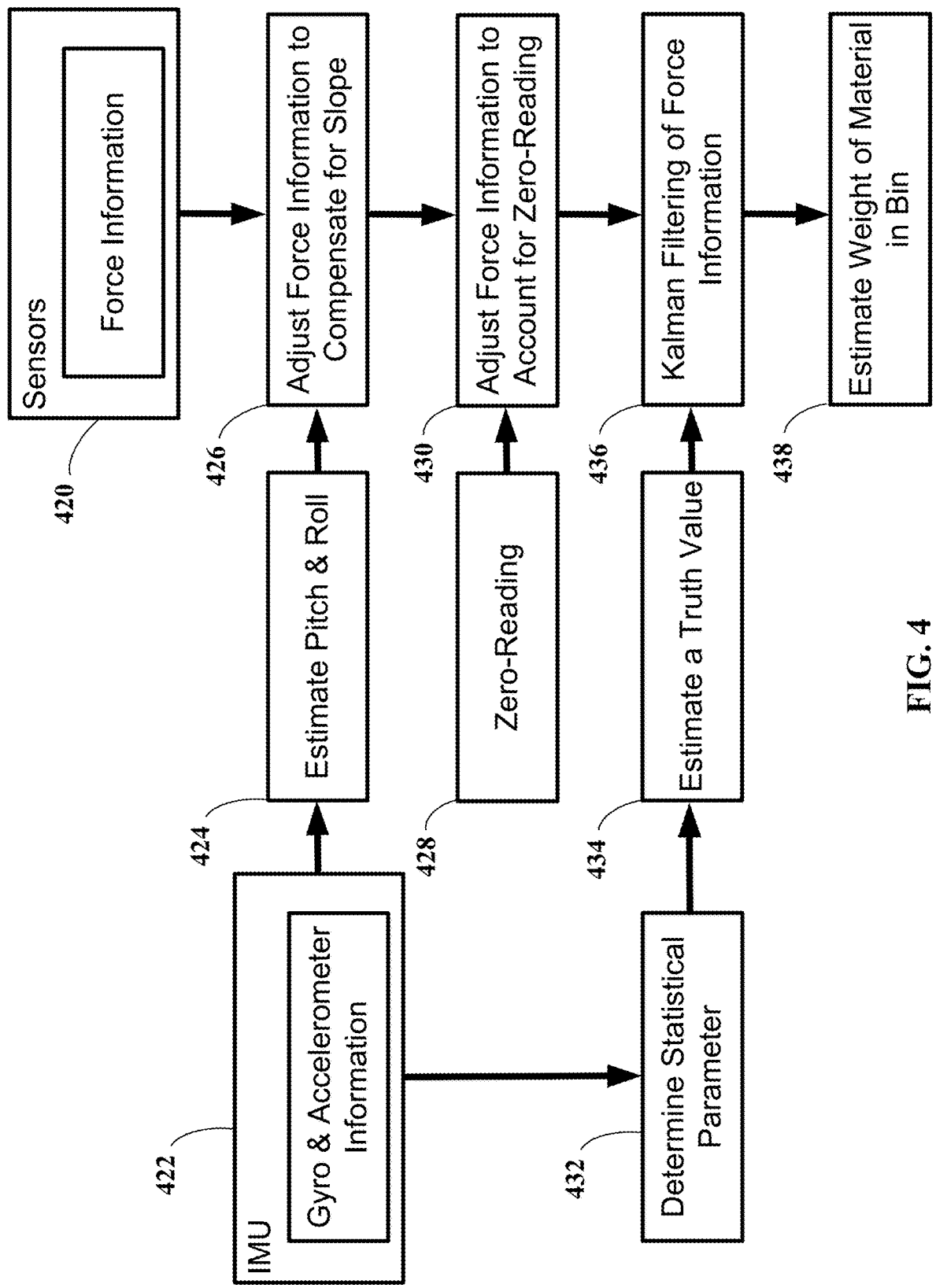
FIG. 4 is a simplified flowchart illustrating a method for estimating weight of a material in a bin in accordance with an embodiment.

FIG. 4 is a simplified flowchart illustrating a method for estimating weight of material in a bin in accordance with an embodiment. Sensors output signals associated with force information (420). The signals can be amplified and converted to digital for processing. The sensors may be coupled to or arranged under a bin. Disturbances can cause readings from the sensors to vary. In some embodiments, the force information from the sensors can be pre-filtered to reduce an impact of the disturbances.

An IMU outputs signals associated with gyroscope and accelerometer information (422). The signals can be amplified and converted to digital for processing. The IMU may be coupled to the bin. Like the sensors, the signals from the IMU can exhibit variances as the bin bounces around. Also like the sensors, the gyroscope and accelerometer information can be pre-filtered to reduce an impact of the disturbances.

The gyroscope information and the accelerometer information can be used to estimate pitch and roll (424). The pitch and roll estimates can also be impacted by the disturbances and can be filtered to reduce the impact. The force information from the sensors (420) is adjusted to compensate for slope using the pitch and roll (426). Slope-compensated force information improves accuracy of weight measurements.

A zero-reading from the sensors indicating a weight of an empty or substantially empty bin may be obtained (428). A bin may be substantially empty when the material has been unloaded but some material still remains in the bin. The zero-reading provides a zero measurement from the sensors when the bin is empty. The force information can be adjusted to account for the zero-reading (430). The force information may be adjusted by subtracting a zero-reading value from the force information.

A Kalman filter setting is determined using gyroscope and accelerometer information. Variation in the gyroscope and accelerometer information can provide an indication of the magnitude of the disturbances in the system that could impact the force information. In some embodiments, statistical parameters (432) can be determined as indicators of a magnitude of the disturbances (e.g., standard deviations from the angular acceleration of yaw, pitch, and roll values from the gyroscope information and standard deviations from the X, Y, and Z values from the accelerometer information). In an embodiment, a maximum or average value from the standard deviations is used to determine the Kalman filter setting. The maximum value of the standard deviations can be an indicator of the magnitude of the disturbances. Other features or properties of the gyroscope information and the accelerometer information can be used as indicators of the magnitude of the disturbances in other embodiments.

One or more of the statistical parameters (432) may be used to estimate a truth value (434) for the force information. The truth value (434) is used to determine the Kalman filter setting (436) used to filter the force information and estimate a weight of the material in the bin (438). If the truth value is high (high measurement noise or large disturbances), the weight is based more on a model. If the truth value if low (low measurement noise or small disturbances), the measurement value of the sensor has a larger impact on the calculated weight. The Kalman filter setting may be a ratio that is related to reliance on the model versus reliance on sensor measurements.

The slope-compensated force information may include a value from each sensor, while the zero-adjusted force information provided to the Kalman filter may be a single value that is a sum of the zero-adjusted force information values from each of the sensors. Alternatively, each sensor may be associated with a Kalman filter. A weight of material in the bin is estimated using output from the Kalman filter (438). A model may be used to determine the weight of the material using the output from the Kalman filter. The model may convert the output signal to weight. For example, the model may be a linear model that correlates output in voltage to weight.

Figure 5:
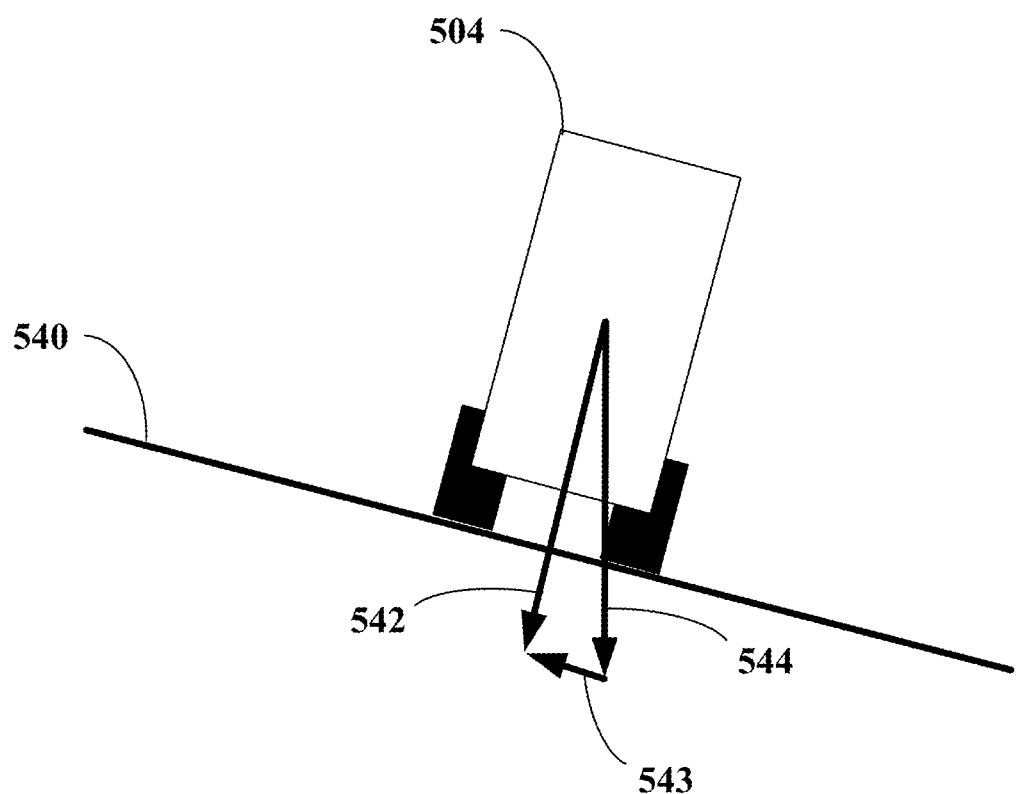
FIG. 5 is a simplified drawing illustrating primary components of slope compensation in accordance with an embodiment.

FIG. 5 is a simplified drawing illustrating primary components of slope compensation in accordance with an embodiment. This example shows a bin 504 on a slope 540. The bin 504 may be on a trailer or truck that is mobile. The slope causes error in force information measurements obtained from sensors such as load cells (not separately shown in this example) when compared to the same load measured on flat ground. In this figure, arrow 544 represents the actual force information measured by the sensors, arrow 543 represents an offset caused by tilt of the bin 504, and arrow 542 represents the compensated force information. Although the example in FIG. 5 only represents the tilt along one axis (roll), there may be an additional component in the other axis (pitch). The slope compensation accounts for the tilt of both axes. The force information from each of the sensors may be compensated for the slope of the bin 504.

Figure 6:
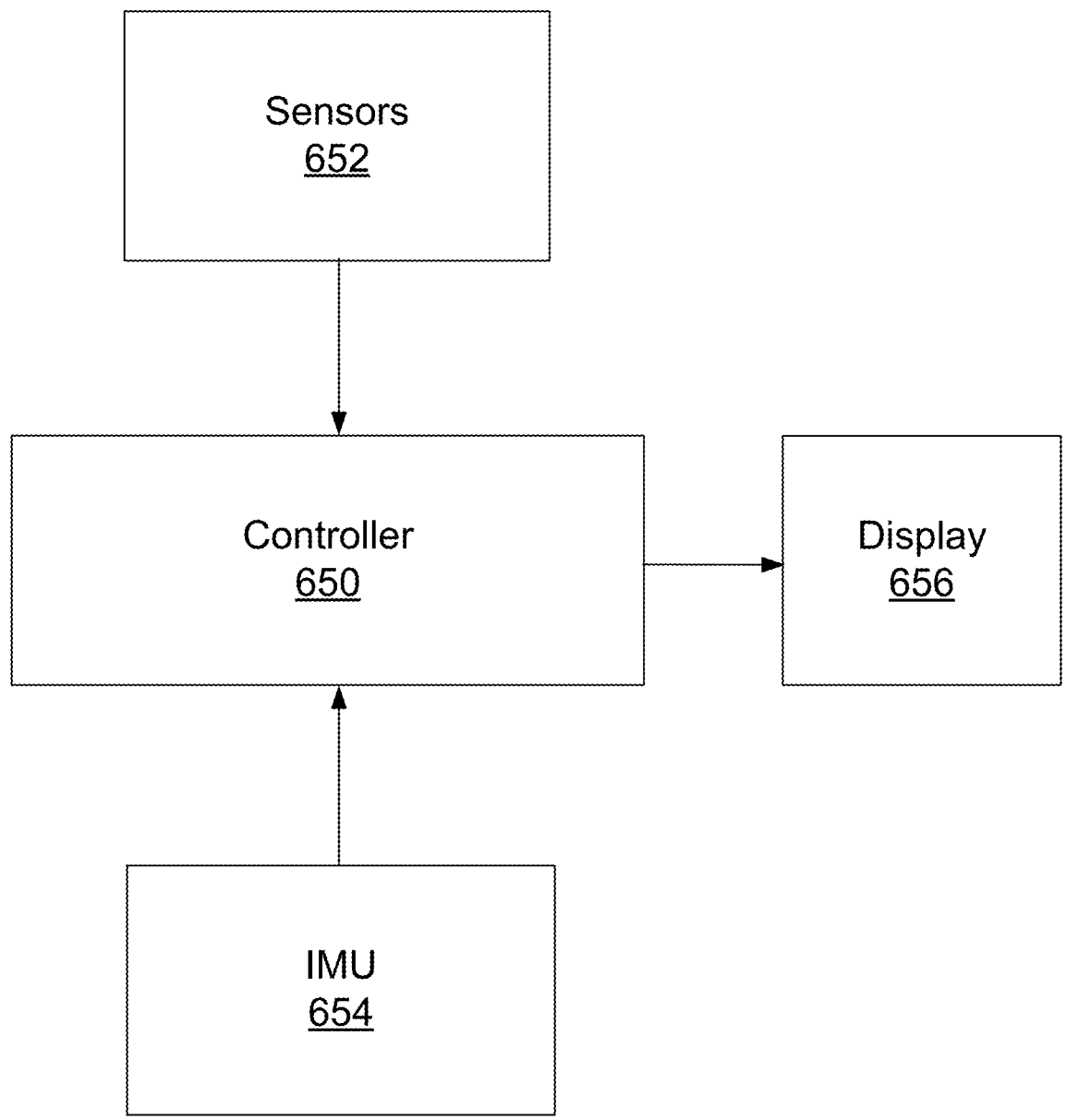
FIG. 6 is a simplified block diagram of an exemplary system for estimating weight of material in a bin in accordance with an embodiment.

FIG. 6 is a simplified block diagram of an exemplary system for estimating weight of material in a bin in accordance with an embodiment. The system includes a controller 650, sensors 652, IMU 654, and a display 656. This figure is not intended to necessarily represent separate software and/or hardware modules, but to represent different functions. Some of these functions may be carried out by software and/or hardware modules. A least some of these modules typically include familiar software and hardware components. For example, they may include operating systems, processors, local memory for storage, I/O devices, and system buses interconnecting the hardware components. RAM and disk drives are examples of local memory for storage of data and computer programs. Other types of local memory include magnetic storage media, optical storage media, flash memory, networked storage devices, and the like.

While the modules in FIG. 6 are illustrated individually, some of them may be combined in some embodiments. For example, the controller 650 may be integrated with the IMU 654 or the display 656. This figure is provided merely as an example of a system that may implement some of the methods described herein. Other systems implementing the embodiments described herein may include other or different modules and/or configurations.

In some embodiments, the sensors 652 include weighing systems that provide force information based on weight of the bin. The weighing systems may include load cells or any other sensors that are arranged under the bin to measure force or weight. The load cells may be positioned along edges, near corners, or under a center portion of the bin. Other configurations are possible. As an example, the bin may be supported from a top side in a hanging configuration with the load cells arranged as part of the support structure to measure force information from the hanging bin.

The IMU 654 may be coupled to the bin and provide gyroscope and accelerometer information as a function of orientation and movement of the bin respectively. The IMU 654 may be separate from the controller 650 or may be integrated with the controller 650. In some embodiments, the IMU 654 and controller 650 share at least part of a common housing (e.g., the IMU 654 may be attached to a PCB of the controller 650 or the IMU 654 may be mounted inside a housing of the controller 650). The gyroscope information and the accelerometer information may be used for slope compensation, and the gyroscope information and/or the accelerometer information may be used as an indicator of a magnitude of the disturbances within the system caused by sharp movements of the system. The disturbances may be mostly a function of moving the bin over uneven or rough terrain such as across a field during harvest of an agricultural crop.

The display 656 is communicatively coupled to the controller 650 and configured to receive filtered force information or weight information from the controller 650. The controller 650 may be configured to estimate the weight of the material in the bin based on the filtered force information. The display 656 is configured to display a value or plot of the estimated weight for a user.

Figure 7:
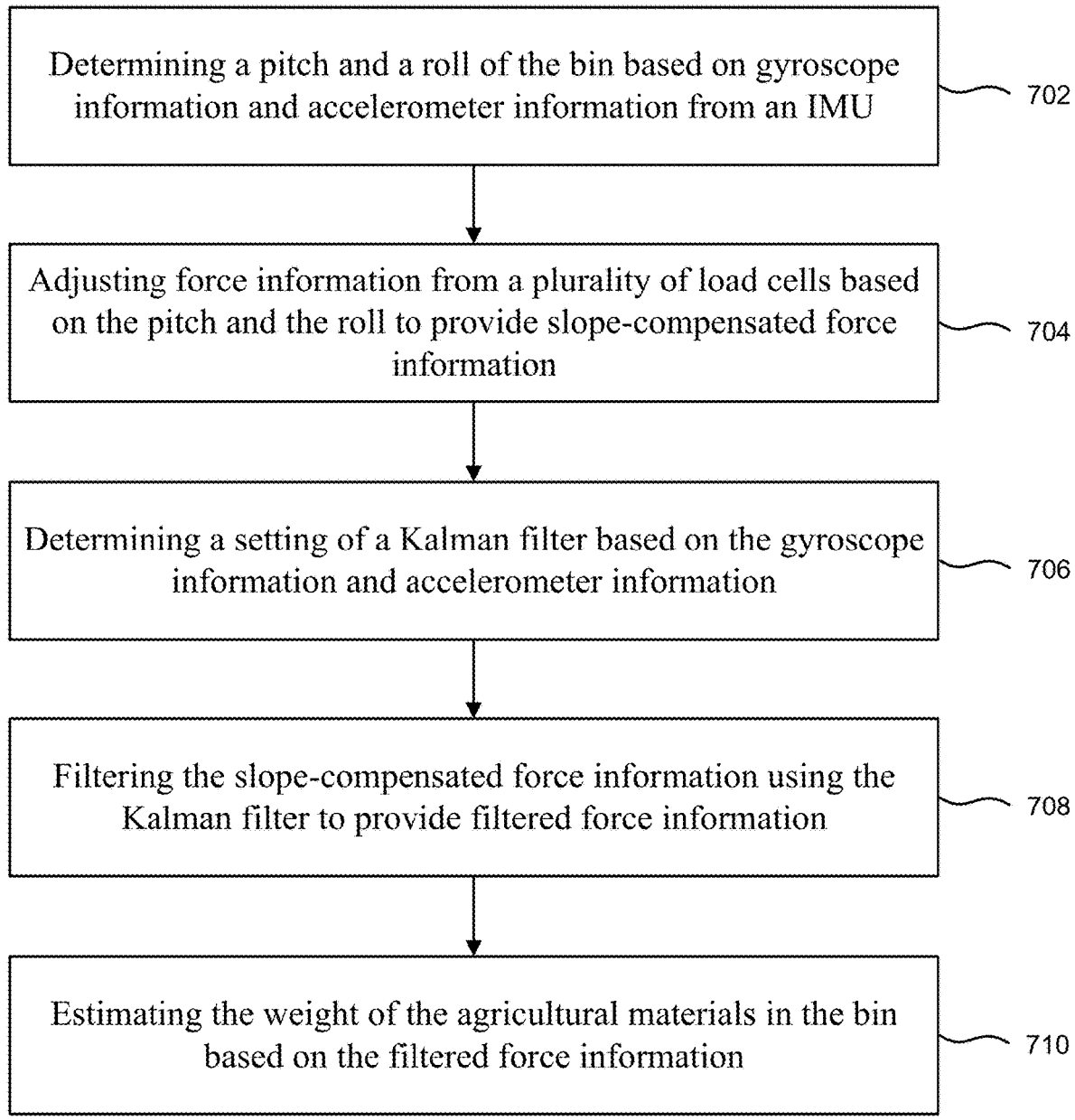
FIG. 7 is a flowchart illustrating an exemplary method for estimating weight of agricultural materials in a bin in accordance with an embodiment.

FIG. 7 is a flowchart illustrating an exemplary method for estimating weight of agricultural materials in a bin in accordance with an embodiment. The method includes determining a pitch and a roll of the bin based on gyroscope information and accelerometer information from an IMU (702). The IMU may be coupled to the bin or chassis and configured to provide the gyroscope information and accelerometer information as a function of orientation and movement of the bin respectively.

The method also includes adjusting force information from a plurality of load cells based on the pitch and the roll to provide slope-compensated force information (704). The plurality of load cells may be configured to provide force information as a function of a weight of the bin and a weight of the agricultural materials in the bin.

The method also includes determining a setting of a Kalman filter based on the gyroscope information and the accelerometer information (706). The gyroscope information and the accelerometer information may provide an indication of disturbances within the system caused by sudden movements of the bin.

The method also includes filtering the slope-compensated force information using the Kalman filter to provide filtered force information (708), and estimating the weight of the agricultural materials in the bin based on the filtered force information (710).

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A system for estimating weight of agricultural materials in a bin, comprising:
   a plurality of load cells configured to provide force information as a function of a weight of the bin and a weight of the agricultural materials in the bin;
   an inertial measurement unit (IMU) coupled to the bin and configured to provide gyroscope information and accelerometer information as a function of orientation and movement of the bin respectively; and
   a controller configured to receive the force information from the plurality of load cells and the gyroscope information and the accelerometer information from the IMU, the controller configured to:
      determine a pitch and a roll of the bin based on the gyroscope information and the accelerometer information;
      adjust the force information based on the pitch and the roll to provide slope-compensated force information;

adjust the slope-compensated force information based on a zero-reading from the load cells obtained when the bin is substantially empty to obtain adjusted force information;
determine a maximum standard deviation of the gyroscope information and of the accelerometer information;
determine a setting of a Kalman filter based on the maximum standard deviation;
filter the adjusted force information using the Kalman filter to provide filtered force information; and
estimate the weight of the agricultural materials in the bin based on the filtered force information.

2. The system of claim 1 further comprising a display configured to receive the estimate of the weight of the agricultural materials in the bin and display the estimate of the weight.

3. The system of claim 1 wherein the slope-compensated force information includes force information from each of the plurality of load cells, and wherein the adjusted force information provided to the Kalman filter includes a single adjusted force information value that is a sum of adjusted force information values from each of the plurality of load cells.

4. The system of claim 1 wherein the force information provided from the plurality of load cells is a single value that is an average of force information values from each of the plurality of load cells.

5. The system of claim 1 wherein the controller is further configured to filter the pitch and the roll before adjusting the force information based on the pitch and the roll.

6. The system of claim 1 wherein the controller is further configured to pre-filter the force information to provide pre-filtered force information, and the pre-filtered force information is adjusted based on the pitch and the roll to provide the slope-compensated force information.

7. The system of claim 1 wherein the maximum standard deviation is determined based on at least one of standard deviations from angular acceleration of yaw, pitch, and roll values from the gyroscope information and standard deviations of X, Y, and Z values from the accelerometer information.

8. The system of claim 1 wherein the IMU and the controller share at least part of a common housing that is coupled to the bin or the IMU and controller are integrated on a same printed circuit board (PCB).

9. The system of claim 1 wherein the plurality of load cells and the IMU are communicatively coupled to the controller via wired communications.

10. A system for estimating weight of a material in a bin, comprising:
a plurality of sensors configured to provide force information based on a weight of the bin and a weight of the material in the bin;
an inertial measurement unit (IMU) coupled to the bin and configured to provide gyroscope information and accelerometer information based on orientation and movement of the bin respectively; and
a controller communicatively coupled to the plurality of sensors and to the IMU, the controller configured to receive the force information from the plurality of sensors and the gyroscope information and the accelerometer information from the IMU, the controller configured to:
compensate the force information based on slope of the bin to provide slope-compensated force information;
filter the slope-compensated force information using a Kalman filter to provide filtered force information, the Kalman filter using a setting that is determined based on a maximum standard deviation of the gyroscope information and the accelerometer information; and
estimate the weight of the material in the bin based on the filtered force information.

11. The system of claim 10 wherein the controller is further configured to adjust the slope-compensated force information based on a zero-reading from the plurality of sensors obtained when the bin is substantially empty, the slope-compensated force information adjusted prior to filtering the slope-compensated force information.

12. The system of claim 10 wherein the controller is further configured to determine the maximum standard deviation of the gyroscope information and of the accelerometer information.

13. The system of claim 10 wherein the slope-compensated force information includes force information from each of the plurality of sensors, and wherein the slope-compensated force information provided to the Kalman filter includes a single slope-compensated force information value that is a sum of slope-compensated force information values from each of the plurality of sensors.

14. The system of claim 10 wherein each of the plurality of sensors include one or more load cells.

15. The system of claim 10 further comprising a display, the controller configured to communicate with the display via wireless communications, and wherein the display is configured to receive the estimate of the weight of the material in the bin from the controller and display the estimate of the weight.

16. The system of claim 10 wherein the controller is further configured to determine the slope of the bin based on the gyroscope information and the accelerometer information.

17. The system of claim 10 wherein the controller is further configured to pre-filter the force information to provide pre-filtered force information, and the pre-filtered force information is adjusted based on the slope to provide the slope-compensated force information.

18. A method for estimating weight of agricultural materials in a bin, the method comprising:
determining a pitch and a roll of the bin based on gyroscope information and accelerometer information from an inertial measurement unit (IMU), wherein the IMU is coupled to the bin and configured to provide the gyroscope information and the accelerometer information as a function of orientation and movement of the bin respectively;
adjusting force information from a plurality of load cells based on the pitch and the roll to provide slope-compensated force information, wherein the plurality of load cells are configured to provide force information as a function of a weight of the bin and a weight of the agricultural materials in the bin;
determining a setting of a Kalman filter based on a maximum standard deviation of the gyroscope information and the accelerometer information;
filtering the slope-compensated force information using the Kalman filter to provide filtered force information; and
estimating the weight of the agricultural materials in the bin based on the filtered force information.

19. A non-transitory computer-readable medium comprising instructions that when executed by a processor cause a controller to perform the method claim 18.

20. A controller configured to perform the method of claim 18.

* * * * *